Figure 1:
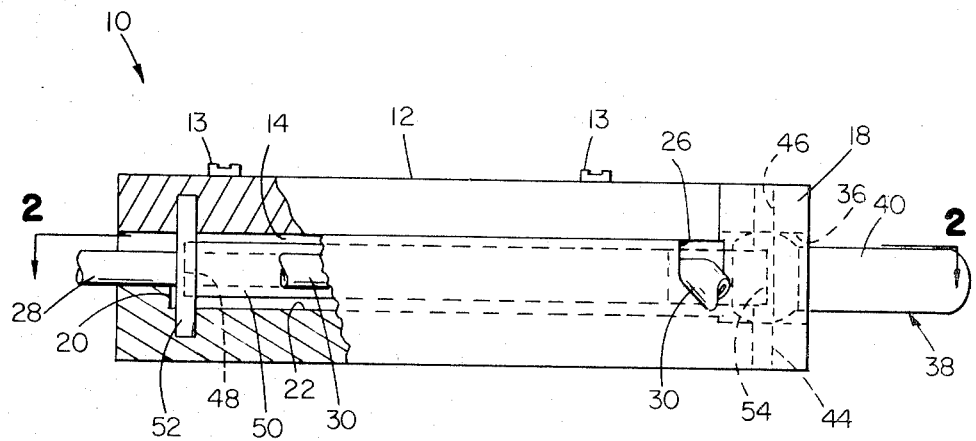

United States Patent

Gaines

[15] 3,635,251
[45] Jan. 18, 1972

[54] VALVE

[72] Inventor: Stanley L. Gaines, Wayland, Mass.

[73] Assignee: Instrumentation Laboratory, Inc., Lexington, Mass.

[22] Filed: Apr. 7, 1970

[21] Appl. No.: 27,196

[52] U.S. Cl..................................137/636, 137/607, 251/9, 251/75
[51] Int. Cl......................................F16l 55/14, F16k 31/56
[58] Field of Search ......................137/607, 636; 251/4, 5, 6, 251/7, 9, 10, 75

[56] References Cited

UNITED STATES PATENTS

| 2,888,877 | 6/1959 | Shellman et al.....................251/9 UX |
| 3,450,152 | 6/1969 | Ouellette..............................251/5 X |
| 3,467,139 | 9/1969 | Richards..............................251/75 X |

FOREIGN PATENTS OR APPLICATIONS

| 699,595 | 12/1940 | Germany.................................251/75 |

*Primary Examiner*—Robert G. Nilson
*Attorney*—Willis M. Ertman

[57] ABSTRACT

A bistable double-acting valve includes a valve body having two opposed compression surfaces and an elongated spring element located between the two compression surfaces and having a first end pivotally secured to the valve port and its other end secured to an actuating lever. The length of the spring is such that a smooth curve is formed between its two ends in each of the two bistable positions, and in each bistable position the spring clamps a section of tubing against a corresponding compression surface to block fluid flow through that tubing.

6 Claims, 2 Drawing Figures

PATENTED JAN 18 1972 3,635,251

VALVE

This invention relates to valves. In particular, it relates to a bistable double-acting valve for controlling the flow of fluids through two sections of resiliently deformable tubing.

It is an object of the invention to provide a novel and improved bistable valve arrangement that will permit fluid flow through either of two lines, but that under normal conditions will not permit flow through both lines at once. Another object of this invention is to provide such a valve that will release itself under excess pressure, thereby avoiding rupture in the line. It is a further object to provide a valve that is capable of releasing itself with respect to one line in response to a given excess pressure and with respect to the second line in response to a different excess pressure. Still another object is to provide a novel and improved bistable valve that is simple to make, inexpensive, and reliable.

The invention features a bistable double-acting valve for permitting fluid flow through either of two sections of resiliently deformable tubing, but not permitting flow through both sections at once. The valve has a valve body defining first and second compression surfaces. A lever is secured to the valve body for angular motion about a pivot axis, between two extreme positions; the lever has a handle on one side of the pivot axis and a spring-receiving portion on the other side of the axis. An elongated spring element is disposed between the compression surfaces and has a first end secured to the spring-receiving portion of the lever, and a second end secured to the valve body. The length of the spring is such that a smooth curve is formed between the two ends in each of two bistable positions. The valve body has positioning means for positioning a portion of each section of tubing along a corresponding compression surface for compression between the spring element and that compression surface.

Thus, when the lever is in a first extreme position, the spring compresses the first section of tubing against the first compression surface, constricting the tubing and preventing flow through it, while permitting flow through the second section. When the lever is pivoted to the second extreme position, the spring compresses the second section of tubing against the second compression surface, constricting the tubing and preventing flow through it, while permitting flow through the first section.

In a preferred embodiment, the pivot axis of the lever and the second end of the spring are parallel and define a plane; the two compression surfaces are generally planar and are generally parallel to and spaced equally from this plane.

The spring has two generally planar compression sides, with at least a portion of each compression side parallel to a compression surface.

The surface dimension of each compression side perpendicular to the length of the spring element is at least as great as the larger diameter of the tubing when constricted. The length of the spring element is sufficient to form a smooth curve extending from the first end to the second end with at least a point within the parallel portion of the compression side proximate to the first compression surface touching that surface when the lever is in the first extreme position, and to form a similar smooth curve with at least a point within the parallel portion of the second compression side touching the second compression surface when the lever is in the second extreme position. The two sections of tubing in which flow is controlled are connected by a T-connector to a third section of tubing downstream of the tubing sections which may be constricted by the spring.

Figure 2:
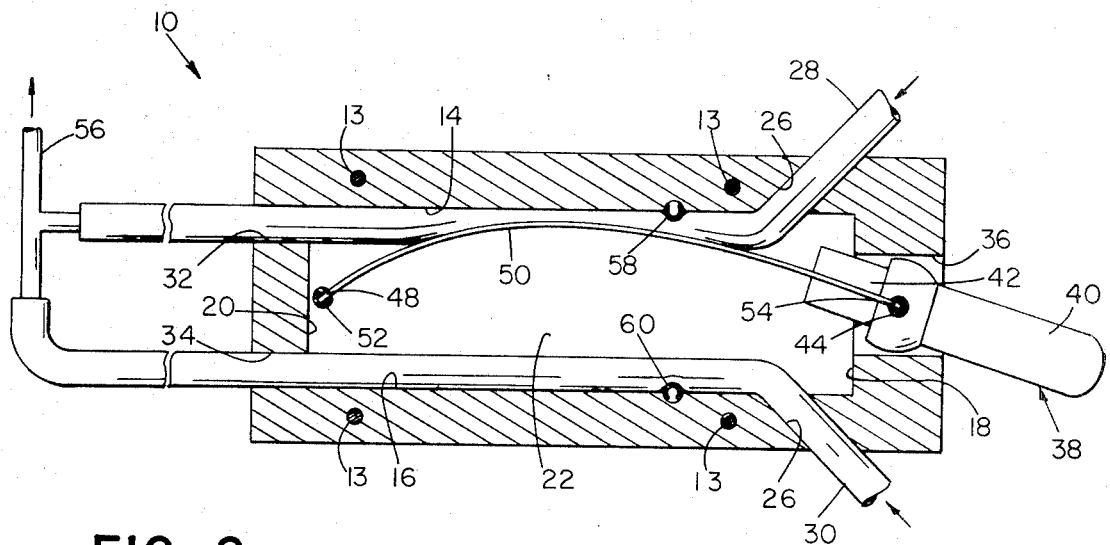

Other objects, features and advantages will appear from the following description of a preferred embodiment of the invention, taken together with the attached drawings thereof, in which:

FIG. 1 is a side elevational view, with parts broken away, of a valve constructed according to the invention; and FIG. 2 is a sectional view taken along the line 2—2 of FIG. 1.

With reference to FIGS. 1 and 2, the valve assembly includes a valve body 10 to which a cover portion 12 is removably secured by four screws 13. Body 10 has parallel sidewalls 14 and 16, front wall 18 rear wall 20, and bottom 22. Sidewall 16 has an entrance opening to admit a section 30 of tubing, and sidewall 14 has a similar opening, not shown, to admit section 28 of tubing. Rear wall 20 has two exit apertures 32 and 34 for the tubing. Between the entrance openings and exit apertures, the tubing sections 28 and 30 lie parallel to sidewalls 14 and 16 and touching them. Front wall 18 includes an opening 36 through which operating lever 38 extends, with handle portion 40 outside front wall 18 and spring-receiving portion 42 inside. Lever 38 is secured in place by pivot pin 44 that extends through bore 46 in front wall 18. The end 48 of flat spring 50, seen in FIG. 2 with narrow edge uppermost, is secured to pivotable pin 52 that extends between floor 22 and cover 12, and its opposite end 54 is secured to the spring-receiving portion 42 of lever 38. Tubing sections 28 and 30 are joined by a T-connector 56 externally of valve body 10 and downstream of the portions to be constricted. Pins 58, 60 form projections in the sidewalls 14, 16 respectively.

In the valve of this invention, spring 50 has two stable positions in which it constricts one tube or the other. When lever 38 is in the extreme position shown in FIG. 2, spring-receiving portion 42 so orients spring 50 that it presses against tubing section 28, compressing it against wall 14 and pin 58 and thereby cutting off flow within tube 28. When lever 38 is moved from the position shown to the opposite extreme position, it pivots about pin 44, causing spring-receiving portion 42 to move end 48 of spring 50. This releases tube 28, but since spring 50 is too long to extend in a straight line between lever 38 and pin 52 and is resilient, it snaps across the chamber between walls 14 and 16 and presses tubing section 30 against wall 16 and pin 60, blocking flow through that section.

This valve assembly therefore has two stable positions and reliably cuts off flow in either of two tubes. It will not remain stably in any intermediate position. Should the pressure in a constricted line become excessive, however, the biasing force of spring 50 will be overcome and the valve will open in throttling mode, releasing that section of tubing sufficiently to prevent rupture of the tubing. When the pressure is reduced, the valve will automatically reclose.

One embodiment of this invention is used to select one of two gases for calibration of a measuring electrode. The gases flow through two sections 28, 30 of surgical latex tubing, each one-eighth inch in outer diameter and one-sixteenth inch in inner diameter, and of 30 durometer hardness. Sidewalls 14, 16 are spaced 0.625 inch apart. Spring 50 is spring steel 2.078 inches long, 0.200 inch wide, and 0.010 inch thick, and when it is in position in the valve body, the two ends 48, 54 are separated by 2.031 inches. This valve will not leak when the pressure applied for tube sections 28, 30 is 15 p.s.i.

It will be appreciated that by varying the length and/or position of spring 50, a greater or lesser section of the spring can be caused to press against the tubing, thereby providing more or less constricting force. Therefore, for example, if it is permissible or desirable to relieve pressure in one line at a different value than in the other line, the spring ends may be secured at points closer to one side than the other, for example closer to side 14 than to side 16. In this case, spring 50 will press with greater force against side 14 than against side 16; therefore a greater pressure in tube 28 than in tube 30 will be required to open the valve.

While particular embodiments of the invention have been shown and described, various modifications will be apparent to those skilled in the art and therefore it is not intended that the invention be limited to the disclosed embodiment or to details thereof and departures may be made therefrom within the spirit and scope of the invention.

What is claimed is:

1. A bistable double-acting valve for permitting fluid flow through either of two sections of resiliently deformable tubing, but not permitting flow through both at once, comprising a valve body defining first and second oppositely disposed compression surfaces, a lever secured to said valve body for angular motion about a pivot axis and between two extreme positions, and having a handle on one side of said pivot axis and a spring-receiving portion on the other side of said pivot axis, and an elongated spring element disposed between said compression surfaces and having a first end secured to said spring-receiving portion of the lever, and a second end secured to said valve body, the length of said spring element being such that a smooth curve is formed between said two ends in each of two bistable positions, said valve body having positioning means for positioning a portion of each section of tubing along a corresponding said compression surface for compression between said spring element and that compression surface, whereby when said lever is in said first extreme position, said spring element compresses said first section of tubing against said first compression surface, constricting said tubing and preventing fluid flow therethrough, while permitting fluid flow through said second section, and when said lever is pivoted to said second extreme position, said spring element compresses said second section of tubing against said second compression surface, constricting said tubing and preventing fluid flow therethrough, while permitting fluid flow through said first section.

2. The valve of claim 1 wherein said spring element has first and second compression sides, the surface dimension of each compression side perpendicular to the length of said spring being at least as great as the larger diameter of said tubing when constricted, said spring element being disposed between said compression surfaces with at least a portion of each compression side parallel to a said compression surface, the length of said spring element being sufficient to form a smooth curve extending from said first to said second end and having at least a tangent point within said parallel portion of the compression side proximate to said first compression surface tangent to said surface when said lever is in said first extreme position, and having at least a tangent point within said parallel portion of the compression side proximate to said second compression surface tangent to said surface when said lever is in said second extreme position, whereby when said lever is in first said extreme position, said spring element compresses first said section of tubing against said first compression surface at said tangent point, and when said lever is pivoted to said second extreme position, said spring element compresses second said section of tubing against said second compression surface at said second tangent point.

3. The valve of claim 2 wherein said compression sides of said spring element and said compression surfaces of said valve body are generally flat.

4. The valve of claim 2 wherein said pivot axis and said second end of said spring element are parallel and define a plane, and said first and second compression surface are generally parallel to and equally spaced from said plane.

5. A bistable double-acting valve for permitting fluid flow through either of two sections of resiliently deformable tubing, but not permitting flow through both at once, comprising a valve body defining first and second compression surfaces, a lever secured to said valve body for angular motion about a pivot axis and between two extreme positions, and having a handle on one side of said pivot axis and a spring-receiving portion on the other side of said pivot axis, and an elongated spring element having first and second compression sides, the surface dimension of each compression side perpendicular to the length of said spring being at least as great as the larger diameter of said tubing when constricted, said spring element being disposed between said compression surfaces with at least a portion of each compression side parallel to a said compression surface, and having a first end secured to said spring-receiving portion of said lever, and a second end secured to said valve body, the length of said spring element being sufficient to form a smooth curve extending from said first to said second end and having at least a tangent point, within said parallel portion of the compression side proximate to said first compression surface tangent to said surface when said lever is in said first extreme position, and having at least a tangent point within said parallel portion of the compression side proximate to said second compression surface tangent to said surface when said lever is in said second extreme position, said valve body having positioning means for positioning a portion of each said section of tubing for compression between said spring element and said compression surface and generally parallel thereto, and said two sections of tubing being connected by a T-connector to a third section of tubing, whereby when said lever is in first said extreme position, said spring element compresses first said section of tubing against said first compression surface at said tangent point, constricting said tubing and preventing fluid flow therethrough while permitting fluid flow through the second and third said sections of tubing, and when said lever is pivoted to said second extreme position, said spring element compresses second said section of tubing against said second compression surface at said second tangent point, constricting said tubing and preventing fluid flow therethrough while permitting fluid flow through the first and third said sections of tubing.

6. A bistable double-acting valve for permitting fluid flow through either of two sections of resiliently deformable tubing, but not permitting flow through both at once, comprising a valve body defining first and second compression surfaces, a lever secured to said valve body for angular motion about a pivot axis and between two extreme positions, and having a handle on one side of said pivot axis and a spring-receiving portion on the other side of said pivot axis, and an elongated spring element, having two generally flat compression sides, the width of each compression side being at least as great as the larger diameter of said tubing when constricted, said spring element being disposed between said compression surfaces with at least a portion of each compression side parallel to a said compression surface, and having a first end secured to said spring-receiving portion of said lever, and a second end pivotally secured to said valve body, said pivot axis and said second end being parallel and defining a plane, and said first and second compression surfaces being generally parallel to and equally spaced from said planes, the length of said spring element being sufficient to form a smooth curve extending from said first to said second end and having at least a tangent point, within said parallel portion of the compression side proximate to said first compression surface tangent to said surface when said lever is in said first extreme position, and having at least a tangent point within said parallel portion of the compression side proximate to said second compression surface tangent to said surface when said lever is in said second extreme position, said valve body having positioning means for positioning a portion of each said section of tubing for compression between said spring element and a said compression surface and generally parallel thereto, and said two sections of tubing being connected by a T-connector to a third section of tubing downstream of said portions, whereby when said lever is in first said extreme position, said spring element compresses first said section of tubing against said first compression surface at said tangent point, constricting said tubing and preventing fluid flow therethrough while permitting fluid flow through the second said section of tubing, and when said lever is pivoted to said second extreme position, said spring element compresses second said section of tubing against said second compression surface at said second tangent point, constricting said tubing and preventing fluid flow therethrough while permitting fluid flow through the first said section of tubing.

* * * * *